(12) United States Patent
Jackson et al.

(10) Patent No.: US 9,292,450 B2
(45) Date of Patent: Mar. 22, 2016

(54) MIGRATION OF DATA TO REGISTER FILE CACHE

(71) Applicant: Imagination Technologies Limited, Kings Langley (GB)

(72) Inventors: Hugh Jackson, St. Albans (GB); Anand Khot, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 96 days.

(21) Appl. No.: 14/189,719

(22) Filed: Feb. 25, 2014

(65) Prior Publication Data

US 2014/0258627 A1    Sep. 11, 2014

(30) Foreign Application Priority Data

Mar. 5, 2013    (GB) .................................. 1303911.0

(51) Int. Cl.
*G06F 12/08*    (2006.01)
*G06F 9/30*    (2006.01)

(52) U.S. Cl.
CPC ........ *G06F 12/0875* (2013.01); *G06F 9/30138* (2013.01)

(58) Field of Classification Search
CPC ............ G06F 12/0855; G06F 12/0875; G06F 9/30138
See application file for complete search history.

(56) References Cited

U.S. PATENT DOCUMENTS 5,881,305 A * 3/1999 Walker ........................... 712/23
5,996,063 A    11/1999 Gaertner et al.
2008/0276076 A1* 11/2008 Abernathy et al. ........... 712/217

FOREIGN PATENT DOCUMENTS

CN    101504618 A    8/2009
CN    102566976 A    7/2012

OTHER PUBLICATIONS

Seznec et al., "Register Write Specialization Register Read Specialization: A Path to Complexity-Effective Wide-Issue Superscalar Processors," Microarchitecture, 2002, MICRO-35 Proceedings, 35th Annual IEEE/ACM International Symposium, Nov. 18-22, 2002, ISBN 978-0-7965-1859-6.

* cited by examiner

*Primary Examiner* — Eric Oberly
(74) *Attorney, Agent, or Firm* — Vorys, Sater, Seymour and Pease LLP; Vincent M DeLuca

(57) ABSTRACT

Methods and migration units for use in out-of-order processors for migrating data to register file caches associated with functional units of the processor to satisfy register read operations. The migration unit receives register read operations to be executed for a particular functional unit. The migration unit reviews entries in a register renaming table to determine if the particular functional unit has recently accessed the source register and thus is likely to comprise an entry for the source register in its register file cache. In particular, the register renaming table comprises entries for physical registers that indicate what functional units have accessed the physical register. If the particular functional unit has not accessed the particular physical register the migration unit migrates data to the register file cache associated with the particular functional unit.

16 Claims, 10 Drawing Sheets

MIGRATION OF DATA TO REGISTER FILE CACHE

BACKGROUND

Modern superscalar processors often have a large number of pipelines which read and write to a large number of physical registers stored in one or more shared register files. However, it is not practical to allow each of the pipelines to access a single register file without making the register file multi-cycle access (e.g. the register file can't be accessed in a single cycle) which reduces performance of the processor.

Accordingly, many superscalar processors implement register file caching where the pipelines write and read to one or more register file caches. However, where the processor has a large number of pipelines the register file caches typically still have a large number of ports. Although these ports present less of a problem than on the main register file (as the register file cache is smaller) the ports require a large number of wires to be routed between all of the pipelines and the register file caches.

The embodiments described below are not limited to implementations which solve any or all of the disadvantages of known processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to methods and migration units for use in out-of-order processors for migrating data to register file caches associated with functional units of the processor to satisfy register read operations. The migration unit receives register read operations to be executed for a particular functional unit. The migration unit reviews entries in a register renaming table to determine if the particular functional unit has recently accessed the source register and thus is likely to comprise an entry for the source register in its register file cache. In particular, the register renaming table comprises entries for physical registers that indicate what functional units have accessed the physical register. If the particular functional unit has not accessed the particular physical register the migration unit migrates data to the register file cache associated with the particular functional unit.

A first aspect provides a method of migrating data to a register file cache, the method comprising: storing in a register renaming table an entry for each of a plurality of physical registers, each entry comprising information indicating each functional unit of a plurality of functional units that has accessed the physical register; receiving at a migration unit a register read operation to be executed for a particular functional unit, the register read operation specifying a particular physical register to be read; reviewing the entries in the register renaming table at the migration unit to determine if the particular functional unit has accessed the particular physical register; and if the particular functional unit has not accessed the particular physical register, migrating data to a register file cache associated with the particular functional unit.

A second aspect provides a migration unit for use in an out-of-order processor to migrate data to a register file cache, the migration unit comprising: a migration requirement detector configured to: receive a register read operation to be executed for a particular functional unit of a plurality of functional units, the register read operation specifying a particular physical register to be read; reviewing entries in a register renaming table to determine if the particular functional unit has accessed the particular physical register, the register renaming table comprising an entry for each of a plurality of physical registers, each entry comprising information indicating each functional unit that has accessed the physical register; and if the particular functional unit has not accessed the particular physical register, initiate migration of data to a register file cache associated with the particular functional unit.

A third aspect provides an out-of-order processor comprising: a register renaming table comprising an entry for each of a plurality of physical registers, each entry comprising information indicating each functional unit of a plurality of functional units that has accessed the physical register; and the migration unit of the second aspect in communication with the register renaming table.

A fourth aspect provides a non-transitory computer readable storage medium having encoded thereon computer readable program code for generating a processor comprising the migration unit of the second aspect.

A fifth aspect provides a non-transitory computer readable storage medium having encoded thereon computer readable program code for generating a processor configured to perform the method of the first aspect.

A sixth aspect provides a single-threaded out-of-order processor as substantially described with reference to FIG. 1.

A seventh aspect provides a migration unit as substantially described with reference to FIG. 3.

An eighth aspect provides a method of determining whether to migrate data to a register file cache substantially as described with reference to FIG. 4.

A ninth aspect provides a migration unit as substantially described with reference to FIG. 8.

A tenth aspect provides a method of determining whether to migrate data to a register file cache substantially as described with reference to FIG. 9.

An eleventh aspect provides a multi-threaded out-of-order processor as substantially described with reference to FIG. 10.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
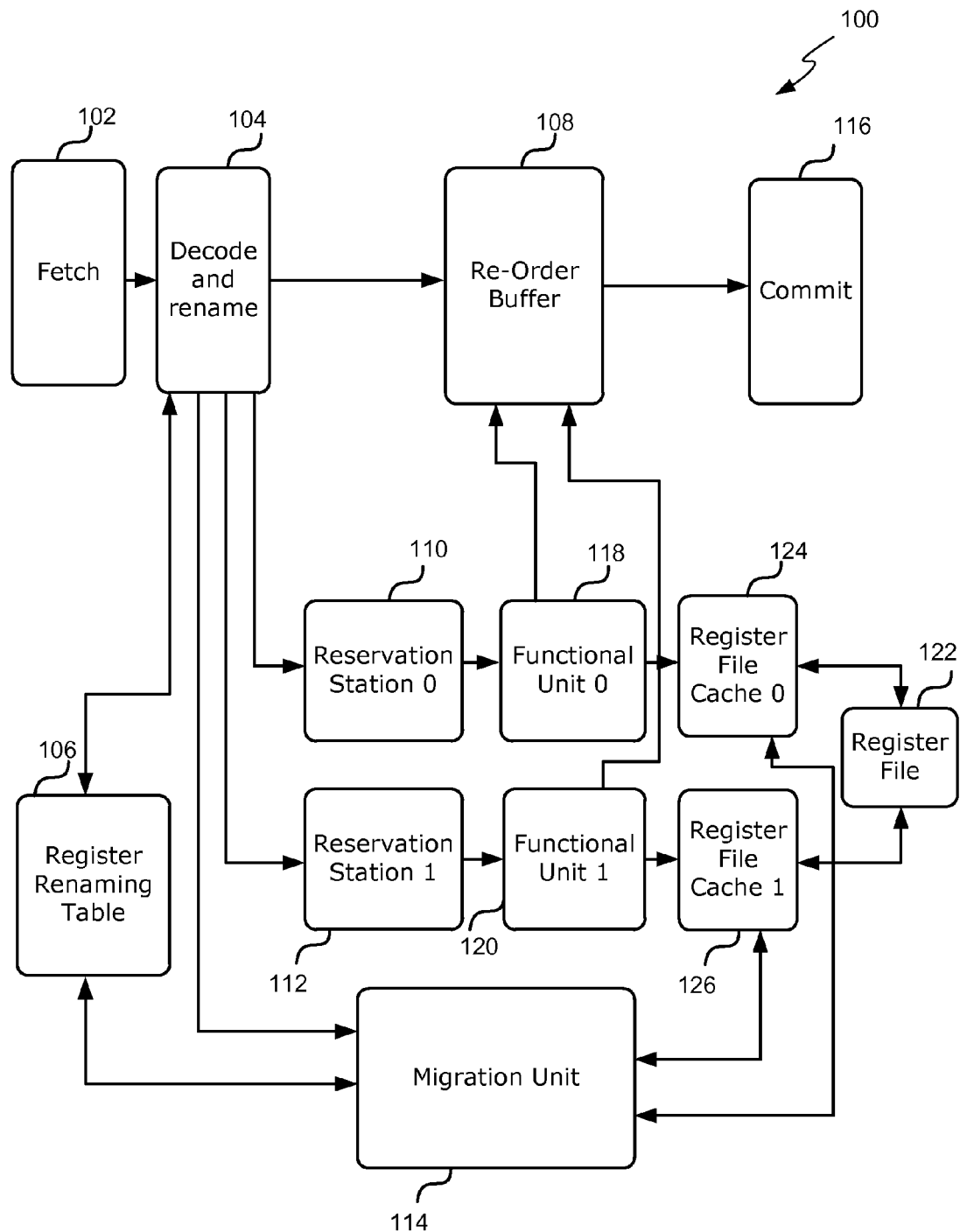
FIG. 1 is a schematic diagram of an example single-threaded out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

In the embodiments described herein the out-of-order pipelines are divided into a plurality of functional units each with an associated register file cache. Each functional unit then performs reads and writes of physical registers on its register file cache. In some cases the pipelines are grouped based on their function (e.g. there may be a group for DSP (digital signal processing) pipelines and a group for integer pipelines). If a functional unit's register file cache does not comprise data for a specific register read operation there is a register file cache miss. Upon a register file cache miss the data is obtained from the register file which requires the instruction and any other later issued related instructions to be removed or flushed from the pipeline.

Generally a register read operation is preceded by a register write operation. Accordingly, when each functional unit has its own register file cache a register read operation executed for (or by) a particular functional unit may cause a register file cache miss when (i) the preceding write operation was performed by the particular functional unit, but the register write data has been evicted from the register file cache before the register read operation has been executed; or (ii) the preceding register write operation was executed by another functional unit thus the corresponding write data is in another register file cache. One possible solution to the second issue would be to enable each functional unit to have access to each of the other functional unit's register file caches. However, this would cause the same problems with performance as granting all of the functional units access to a single shared register file. In the embodiments described herein the second issue is addressed by identifying the issue early in the pipeline (e.g. decode and renaming stage) and migrating the relevant data to the register file cache before the register read operation is executed to increase the chances of a register file cache hit.

In particular, in the embodiments described herein a migration unit keeps a record of which functional units have recently accessed which registers. The migration unit then monitors register read operations to determine whether the functional unit associated with a register read operation has recently accessed the register referred to in the register read operation (i.e. the "source register"). If the particular functional unit has not recently accessed the source register it is unlikely that the associated register file cache comprises an entry for the source register and so the migration unit initiates migration of the relevant data to the functional unit's register file cache to increase the likelihood of a register file cache hit for the register read operation. In some cases the data is migrated from another register file cache. In other cases the data is migrated from the register file itself.

Reference is now made to FIG. 1 which illustrates a single-threaded out-of order processor 100 wherein data is migrated to register file caches to increase the chances of register file cache hits for register read operations. The processor 100 comprises a fetch stage 102 configured to fetch instructions from a program (in program order) as indicated by a program counter (PC). Once an instruction is fetched it is provided to a decode and renaming stage 104.

The decode and renaming stage 104 is arranged to interpret the instructions and perform register renaming. In particular, each instruction may comprise a register write operation; one or more register read operations; and/or an arithmetic or logical operation. A register write operation writes to a destination register and a register read operation reads from a source register. During register renaming each architectural register referred to in an instruction (e.g. each source and destination register) is replaced (or renamed) with a physical register.

For register write operations the architectural register (e.g. destination register) referred to is allocated an unused physical register. Any allocation may be stored in a register renaming table 106 which is a data structure showing the mapping between each architectural register and the physical register most recently allocated. For register read operations the correct physical register for a particular architectural register (e.g. source register) can be determined from an entry in the register renaming table 106 indexed by the architectural register.

After an instruction passes through the decode and renaming stage 104 it is: (i) inserted into a reorder buffer 108 (ROB); (ii) dispatched to a reservation station 110 or 112 for execution by a corresponding functional unit 118 or 120; and (iii) dispatched to a migration unit 114. The reservation station 110 or 112 that the instruction is dispatched to may be based on the type of instruction. For example, DSP instructions may be dispatched to a first reservation station 110 (reservation station 0) and all other instructions may be dispatched to a second reservation station 112 (reservation station 1).

The re-order buffer 108 is a buffer that enables the instructions to be executed out-of-order, but committed in-order. The re-order buffer 108 holds the instructions that are inserted into it in program order, but the instructions within the ROB 108 can be executed out of sequence by the functional units 118 and 120. In some examples, the re-order buffer 108 can be formed as a circular buffer having a head pointing to the oldest instruction in the ROB 108, and a tail pointing to the youngest instruction in the ROB 108. Instructions are output from the re-order buffer 108 in program order. In other words, an instruction is output from the head of the ROB 108 when that instruction has been executed, and the head is incremented to the next instruction in the ROB 108. Instructions output from the re-order buffer 108 are provided to a commit stage 116, which commits the results of the instructions to the register/memory.

Each reservation station 110 and 112 receives instructions from the decode and renaming stage 104 and stores them in a queue. An instruction waits in the queue until its input operand values are available. Once all of an instruction's operand values are available the instruction is said to be ready for execution and may be issued to a corresponding functional unit 118 or 120 for execution. An instruction's operand values may be available before the operand values of earlier, older instructions allowing the instruction to leave the reservation station 110 or 112 queue before those earlier, older instructions.

Each functional unit 118 or 120 is responsible for executing instructions and may comprise one or more functional unit pipelines. The functional units 118 or 120 may be configured to execute specific types of instructions. For example one or more functional units 118 and 120 may be an integer unit, a floating point unit (FPU), a digital signal processing (DSP)/single instruction multiple data (SIMD) unit, or a multiply accumulate (MAC) unit. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The functional units and the pipelines therein may have different lengths and/or complexities. For example, a FPU pipeline is typically longer than an integer execution pipeline because it is generally performing more complicated operations.

While executing the instructions received from the reservation station 110 or 112, each functional unit 118 and 120 performs reads and writes to physical registers in one or more shared register files 122. To reduce the number of input/output ports to each register file 122, each functional unit 118 and 120 has an associated register file cache 124 and 126. Each functional unit 118 and 120 performs register read and write operations on its associated register file cache 124 and 126. In some cases register write operations performed on a register file cache 124 or 126 are immediately written to the register file 122. In other cases the register write operations are subsequently written to the register file 122 as resources become available.

If a register file cache 124, 126 does not comprise an entry for a register specified in a register read operation then there is a register file cache miss. When a register file cache miss occurs the register read operation is performed on the register file 122 which may require the associated instruction and any other later issued related instructions to be removed or flushed from the functional unit pipelines. To reduce the chances of a register file cache miss the processor comprises a migration unit 114.

In particular, the migration unit 114 receives instructions from the decode and renaming stage 104 and records information (e.g. in the register renaming table 106) that indicates which functional units have recently accessed any physical register referred to in the instructions. In particular, as described above, instructions are executed by one of the functional units 118 or 120. For example, Digital Signal Processing (DSP) instructions may be executed by a functional unit that is specially designed for DSP instructions whereas all other instructions may be executed by a general purpose functional unit. When an instruction passes through the decode and renaming stage 104, the decode and renaming stage 104 determines which functional unit 118 or 120 will execute the instruction and provides this information to the migration unit 114 in addition to the instruction. If the instruction comprises a register write or read operation the migration unit 114 records (e.g. in the register renaming table 106) the fact that the functional unit will be accessing the physical register referred to therein. An example register renaming table 106 is described with reference to FIG. 2.

Then for any register read operation in the instructions, the migration unit 114 uses the information in the register renaming table 106 to determine whether to migrate data to a particular register file cache 124 or 126 to reduce the chance of a register file cache miss. In some cases the migration unit 114 may determine to migrate data if the register renaming table 106 indicates that the register file cache 124 or 126 associated with the register read operation (e.g. the register file cache associated with the functional unit that will execute the register read operation) is unlikely to comprise an entry for the register specified in the register read operation (e.g. the source register). In some cases the migration unit 114 may determine that a particular register file cache is unlikely to comprise an entry for the register specified in the read operation if the register renaming table 106 indicates that the associated functional unit 118 or 120 has not recently accessed the specified register.

If the migration unit 114 determines to migrate data to a particular register file cache 124 or 126 the migration unit 114 facilitates the migration to the register file cache 124 or 126. In some cases, facilitating the migration comprises migrating data from one register file cache 124 or 126 to another register file cache 124 or 126. An example migration unit 114 for use in these cases is described in reference to FIG. 3. In other cases, facilitating the migration comprises migrating data from the register file 122 to the particular register file cache 124 or 126. An example migration unit for use in these cases is described in reference to FIG. 8.

In still other cases, facilitating the migration comprises migrating data from a register file cache 124 or 126 or the register file 122. For example, in these cases the migration unit 114 may attempt to migrate data from a register file cache 124 or 126, but if the migration from the register file cache 124 or 126 fails the migration unit 114 may migrate data from the register file 122. A migration from a register file cache 124 or 126 may fail, for example, because the data the migration unit 114 is attempting to migrate no longer exists in the register file cache 124 or 126, or because there are no available read ports for the register file cache 124 or 126.

The processor 100 may also comprise a branch predictor (not shown), which is configured to predict which direction the program flow will take in the case of instructions known to cause possible flow changes, such as branch instructions. Branch prediction is useful as it enables instructions to be speculatively executed by the processor 100 before the outcome of the branch instruction is known.

When the branch predictor predicts the program flow accurately, this improves performance of the processor 100. However, if the branch predictor does not correctly predict the branch direction, then a mis-prediction occurs which needs to be corrected before the program can continue. To correct a mis-prediction, the speculative instructions sent to the ROB 108 are abandoned, and the fetch stage 102 starts fetching instructions from the correct program branch.

Figure 2:
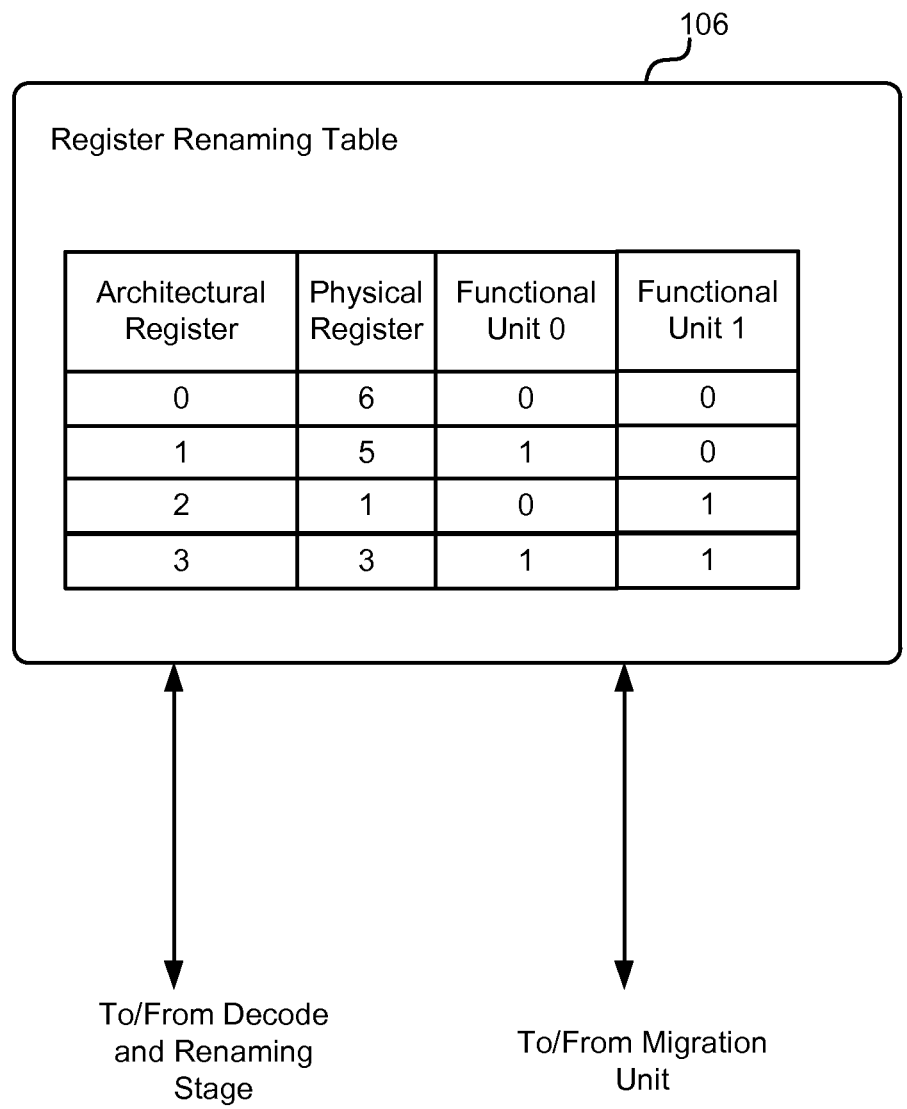
FIG. 2 is a schematic diagram of an example register renaming table of FIG. 1.

Reference is now made to FIG. 2 which illustrates an example register renaming table 106 of FIG. 1. As described above in reference to FIG. 1, during the decode and renaming stage 104 each architectural register referred to in an instruction is replaced with a physical register. Replacing each architectural register with a physical register may comprise: (i) allocating any destination register (e.g. a register written to by a register write operation) an unused physical register; (ii) storing the allocation in the register renaming table 106; and (iii) determining the correct physical register for a source register (e.g. a register read by a register read operation) from the register renaming table 106.

In the example of FIG. 2, the register renaming table 106 comprises four entries indicating the physical register identifiers, indexed by the architectural register identifiers. For example, architectural register 0 currently maps to physical register 6; architectural register 1 currently maps to physical register 5; architectural register 2 currently maps to physical register 1; and architectural register 3 currently maps to physical register 3.

In addition, the migration unit 114 may use the register renaming table 106 to keep track of which functional units have recently accessed each physical register. For example, when the migration unit 114 receives an instruction with a register write operation, the decode and renaming stage 104 may be configured to identify which functional unit (e.g. functional unit 118 or 120) the instruction is associated with and update the register renaming table 106 to indicate that the identified functional unit (e.g. functional unit 118 or 120) has recently accessed the destination register (the physical register written to by the register write operation).

When the migration unit 114 receives an instruction with a register read operation the migration unit 114 may use the information in the register renaming table 106 to determine whether to migrate data to the register file cache 124 or 126 associated with the identified functional unit (e.g. functional unit 118 or 120). In some cases, if the migration unit 114 determines to migrate data to the register file cache 124 or 126 associated with the identified functional unit 118 or 120, the migration unit 114 may update the register naming table 106 to indicate that the identified functional unit 118 or 120 has recently accessed the source register (the physical register read by the register read operation).

In some cases (as shown in FIG. 2), the register renaming table 106 comprise a flag for each functional unit 118 or 120 of the processor 100 that is used to indicate whether the functional unit 118 or 120 has recently accessed the physical register. The flag may be in any suitable form. For example, in some cases the flag may be a single bit and other cases the flag may be a Boolean value.

Each flag may initially be set (e.g. to "0" or "FALSE") when the corresponding physical register column is updated to indicate that the particular functional unit 118 or 120 has not recently accessed the physical register. Then if the migration unit 114 receives an instruction associated with a particular functional unit 118 or 120 (e.g. the instruction will be executed by the particular functional unit) that comprises a register write operation that writes to the physical register then the flag corresponding to the particular functional unit may be set (e.g. to "1" or "TRUE") to indicate that the particular functional unit 118 or 120 has recently accessed the physical register. In some cases the migration unit 114 may also be configured to set the flag corresponding to a particular functional unit 118 or 120 to indicate that the particular functional unit 118 or 120 has recently accessed the physical register when it receives an instruction comprising a register read operation that reads from the physical register and the migration unit 114 has determined to migrate data to the register file cache associated with the particular functional unit to decrease the chances of a register file cache miss.

In the example of FIG. 2, the register renaming table 106 indicates that physical register 6 has not been recently accessed by functional unit 0 or functional unit 1; physical register 5 has been recently accessed by functional unit 0, but not functional unit 1; physical register 1 has been recently accessed by functional unit 1, but not functional unit 0; and physical register 3 has been recently accessed by both functional unit 0 and functional unit 1.

If a functional unit 118 or 120 has recently accessed a physical register then it is likely that its associated register file cache 124 or 126 comprises an entry for the physical register. Conversely, if a functional unit 118 or 120 has not recently accessed a physical register then it is unlikely that its register file cache 124 or 126 comprises an entry for the physical register.

In some cases, the functional unit flags may be reset (e.g. to "0" or FALSE) when certain conditions occur. For example, the register file caches 124 and 126 may be configured to reset an associated flag in the register renaming map 106 when it evicts an entry for a particular register. In another example, the register renaming map 106 may be configured to reset a particular flag after a certain amount of time has elapsed since the flag was set (e.g. to "1" or "TRUE") to indicate the particular functional unit has recently access the physical register.

Figure 3:
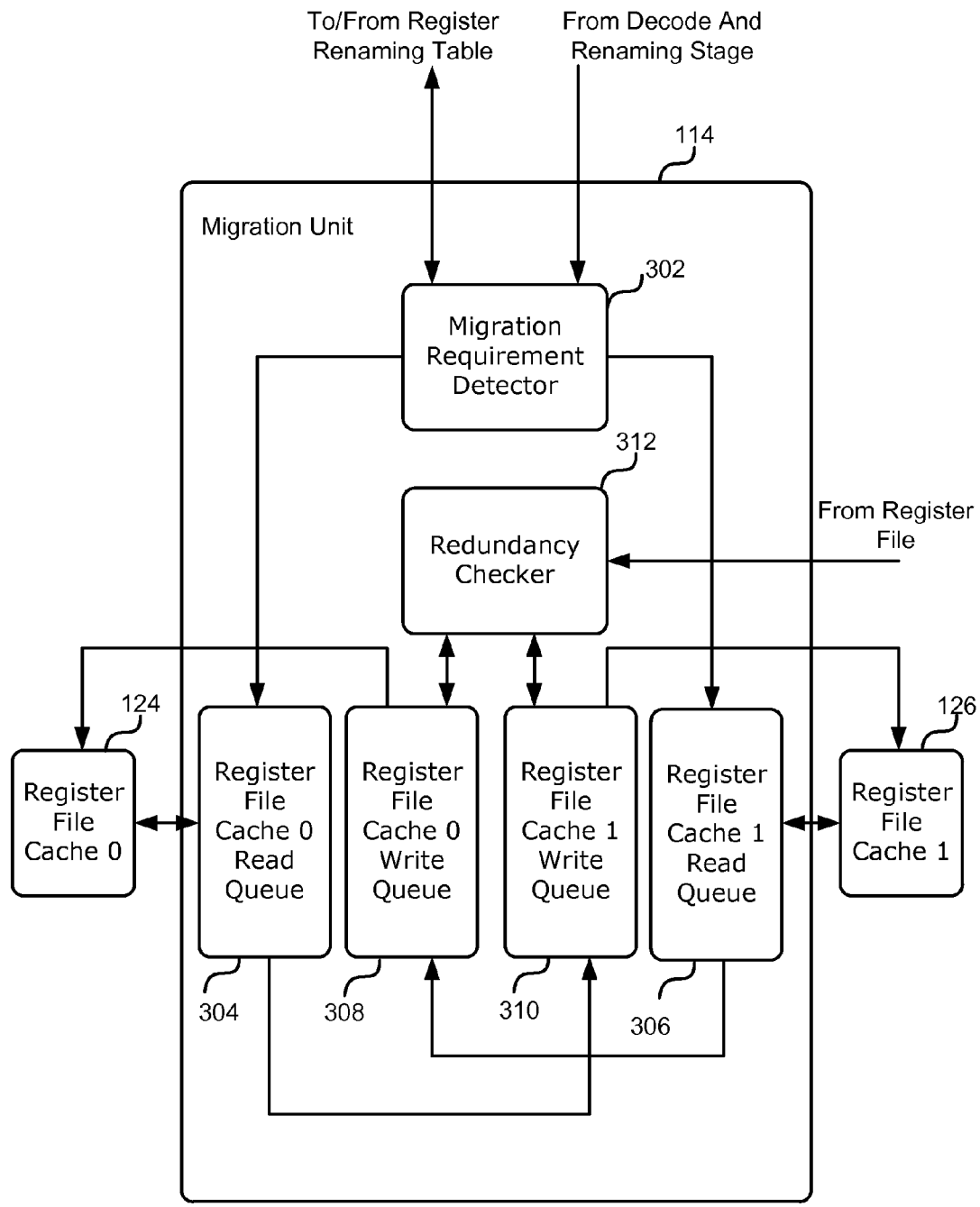
FIG. 3 is a schematic diagram of an example migration unit of FIG. 1.

Reference is now made to FIG. 3 which illustrates a first example migration unit 114 of FIG. 1. As described above in reference to FIG. 1 the migration unit 114 is responsible for migrating data to a particular register file cache upon detecting that a particular register file cache is unlikely to comprise an entry to satisfy a particular register read operation. In particular, the example migration unit 114 of FIG. 3 migrates data from one register file cache to the particular register file cache to satisfy the particular register read operation.

The example migration unit 114 of FIG. 3 comprises a migration requirement detector 302 for receiving instructions from the decode and renaming stage 104 and determining whether to migrate data from one register file cache to another to satisfy any register read operations within the instructions; a plurality of register file cache read queues 304 and 306 for storing and issuing read requests to a particular register file cache 124 or 126; and a plurality of register file cache write queues 308 and 310 for storing and issuing write requests to a particular register file cache 124 and 126.

In some cases there is one read queue and one write queue for each register file cache in the processor. In the processor 100 of FIG. 1 there are two register file caches 124 and 126 and thus the example migration unit 114 of FIG. 3 comprises two read queues 304 and 306 and two write queues 308 and 310. The first read queue 304 reads from the first register file cache 124, and the second read queue 306 reads from the second register file cache 126. Similarly, the first write queue 308 writes to the first register file cache 124, and the second write queue 308 writes to the second register file cache 126. It will be evident to a person of skill in the art that the migration unit 114 may comprise more read and write queues depending on the number of register file caches in the processor.

The migration requirement detector 302 receives instructions from the decode and renaming stage 104. Each instruction may comprise a register write operation and/or one or more register read operations; and an indication of the functional unit that will execute the instruction.

For each register write operation the migration requirement detector 302 updates the register renaming table 106 to indicate that the physical register referred to therein (e.g. the physical register written to by the register write operation) has been recently accessed by the functional unit that will execute the instruction.

For each register read operation the migration requirement detector 302 determines whether to migrate data to one of the register file caches 124 of 126 to satisfy the register read operation. Determining whether to migrate data to a particular register file cache 124 or 126 may comprise analyzing the data in the register renaming table 106 to determine if the register file cache 124 or 126 for the functional unit 118 or 120 associated with the register read operation (e.g. the functional unit 118 or 120 that will execute the register read operation) is likely to comprise an entry for the specified register and if not, whether another register file cache 124 or 126 is likely to comprise an entry for the specified register. In some cases determining whether the register file cache is likely to comprise an entry for the specified register comprises determining if the register renaming table 106 indicates that the functional unit associated with the register file cache recently accessed the physical register.

If the data in the register renaming table 106 indicates that the associated register file cache is unlikely to comprise an entry for the specified register, but another register file cache is likely to have an entry then the migration requirement detector 302 may determine that data relating to the specified register is to be migrated from the other register file cache to the associated register file cache.

In other cases determining whether to migrate data to a particular register file cache may comprise querying the register file cache 124 or 126 for the functional unit 118 or 120 associated with the register read operation (e.g. the functional unit 118 or 120 that will execute the register read operation) to determine if it currently comprises data for the specified register. If the register file cache for the associated functional unit 118 or 120 does not comprise an entry for the specified register then the migration requirement detector 302 may determine that data relating to the specified register is to be migrated from another register file cache.

Once the migration requirement detector 302 determines that data is to be migrated from one register file cache 124 or 126 (the source register file cache) to another register file cache 124 or 126 (the destination register file cache) the migration requirement detector 302 initiates the migration by issuing an appropriate read request to the read queue 304 or 306 for the source register file cache. For example, if the source register file cache is the first register file cache 124, then the migration requirement detector 302 may issue a read request of the specified register to the first read queue 304. Similarly, if the source register file cache is the second register file cache 126, then the migration requirement detector 302 may issue a read request of the specified register to the second read queue 306.

An example method for determining whether to migrate data from one register file cache to another which may be executed by the migration requirement detector 302 is described with reference to FIG. 4.

In some cases, after the migration requirement detector 302 determines that data is to be migrated from one register file cache 124 or 126 to another register file cache 124 or 126, the migration requirement detector 302 may be configured to update the register renaming table 106 to indicate that the physical register referred to therein (e.g. the physical register read by the register read operation) has been recently accessed by the functional unit that will execute the instruction. This is because the data associated with the source register (e.g. the physical register read by the register read operation) will be moved into the associated register file as a result of the migration and thus any subsequent register read operation of the same physical register can be satisfied by the associated register file cache and does not require a migration of data to the associated register file cache.

Each read queue 304 or 306 receives read requests for a specific register file cache 124 or 126 from the migration requirement detector 302 and stores them in a buffer in the order in which they are received. The read requests stored in the buffer are submitted to the corresponding register file cache 124 or 126 in order as the corresponding register file cache 124 or 126 becomes available for reading. The results of the register read request are then provided to the write queue 308 or 310 for the destination register file cache.

A method for reading data from a register file cache which may be executed by the read queues 304 and 306 is described with reference to FIG. 5.

Each write queue 308 or 310 receives write requests for a specific register file cache 124 or 126 (destination register file cache) from one of the read queues 304 or 306 (the read queue associated with the source register file cache) and stores them in a buffer in the order in which they are received. The write requests in the buffer are submitted to the corresponding register file cache 124 or 126 in order as the corresponding register file cache 124 or 126 becomes available for writing. Once the write request has been completed by the register file cache, the data has been successfully migrated from the source register file cache to the destination register file cache.

A method for writing data to a register file cache which may be executed by the write queues 308 and 310 is described with reference to FIG. 6.

The following two examples will be used to illustrate the data flow through the migration unit 114.

In a first example the migration requirement detector 302 determines that data for register six is to be migrated from the first register file cache 124 (source register file cache) to the second register file cache 126 (destination register file cache). To initiate the migration the migration requirement detector 302 issues a read request of register six to the first read queue 304. Once the first register file cache 124 is ready to be read, the read request is sent to the register file cache 124 for lookup. The result of the read request is then sent to the second write queue 310 with a request to write the result to register six. Once the second register file cache is 126 ready to be written to, the write request is sent to the second register file cache 126 for execution. Once the write has been executed the data has been migrated from the source register file cache to the destination register file cache.

In a second example the migration requirement detector 302 determines that data for register thirteen is to be migrated from the second register file cache 126 (source register file cache) to the first register file cache 124 (destination register file cache). To initiate the migration the migration requirement detector 302 issues a read request of register thirteen to the second read queue 306. Once the second register file cache 126 is ready to be read, the read request is sent to the second register file cache 126 for lookup. The result of the read is then sent to the first write queue 308 with a request to write the result to register thirteen. Once the first register file cache 124 is ready to be written to, the write request is sent to the first register file cache 124 for execution. Once the write has been executed the data has been migrated from the source register file cache to the destination register file cache.

In some cases it may take several cycles to migrate data from one register file cache 124 or 126 to another. Accordingly, it is possible that a register read operation is executed by one of the functional units before the data has been successfully migrated to the destination register file cache causing a register file cache miss and a read of the register file. For example, when a pipeline of a functional unit attempts to read a particular register from its register file cache 124 or 126 and a register file cache miss occurs, the instruction in the pipeline is flushed and the register file cache 124 or 126 may attempt to get the particular register data from the register file 122. When this happens the data from the source register file cache no longer needs to be migrated to the destination register file cache.

To address this issue, the migration unit 114 may also comprise a redundancy checker 312 for removing redundant reads in the read queues 304 and 306 and/or redundant writes in the write queues 308 and 310. The redundancy checker 312 monitors register file 122 read requests and if it determines that a register file 122 read request corresponds to a read request in a read queue 304 or 306 or a write request in a write queue 308 or 310 then the redundancy checker 312 may remove the redundant read request from the read queue 304 or 306, or the redundant write request from the write queue 308 or 310.

A read request is said to correspond to a register file read request if: (i) the read request specifies the same register as that specified in the register file 122 read request, and (ii) the destination register file cache for the read request is same as the register file cache that requested the read of the register file. For example, if the second register file cache 126 requested register five be read from the register file 122 and there is a read request of register five waiting in the first read queue 304 and the destination register file cache for the read request is the second register file cache 126 then the redundancy checker 312 may remove the read of register five on the basis that it will no longer help avoid a register file cache miss (i.e. it has already occurred).

A write request is said to correspond to a register file read request if: (i) the write request specifies the same register as that specified in the register file 122 read request, and (ii) the write is directed at the register file cache that requested the read of the register file 122. For example, if the first register file cache 124 requested register eight be read from the register file 122 and there is a write of register eight waiting in the first write queue 308 to be written to the first register file cache 124 then the redundancy checker 312 may remove the write of register eight in the first write queue 308 on the basis that the write will no longer help avoid a register file cache miss (i.e. it has already occurred).

A method for removing redundant reads and writes from the read and write queues, which may be executed by the redundancy checker 312, is described with reference to FIG. 7.

In some cases, instead of removing write requests from the write queues that are redundant due to a register file read, the redundancy checker may be configured to reduce the number of reads of the register file 122 by cancelling a register file read if it matches a write request in one of the write queues 308 or 310. For example, upon receiving notification that a read request of a particular physical register in the register file 122 has been made by a particular register file cache 124 or 126, the redundancy checker 312 may be configured to determine if there is a write request in one of the write queues 308 or 310 that writes to that particular physical register, If the redundancy checker 312 locates a write request to the particular physical register then a read of that register has already been performed and the redundancy checker 312 may cancel the register file 122 read request and provide the data from the write request to the requesting register file cache 124 or 126 to satisfy the request.

For example, if the redundancy checker 312 receives notification that the first register file cache 124 requested a read of register six in the register file 122, the redundancy checker 312 may look at the write queues 308 and 310 to determine if any of them comprise a write request to register six. If the second write queue 310 comprise a write request for register six the redundancy checker 312 may cancel the register file 122 read request and supply the data from the write request to the first register file cache 124 to satisfy the request.

In other cases, the redundancy checker 312 may also be configured to further reduce the number of read requests in the read queues by combining read requests in the same read queue that wish to read the same register, but have different destination register file caches.

For example, the redundancy checker 312 may be configured to periodically check each read queue 304 or 306 to determine if there is more than one read request that wishes to read the same register. If there is more than one read request that wishes to read the same register then the second read request may be removed or nullified from the read queue 304 or 306 and the first read request may be updated to indicate that there are two destination register file caches (the one specified by the first read request and the one specified by the second read request).

Figure 4:
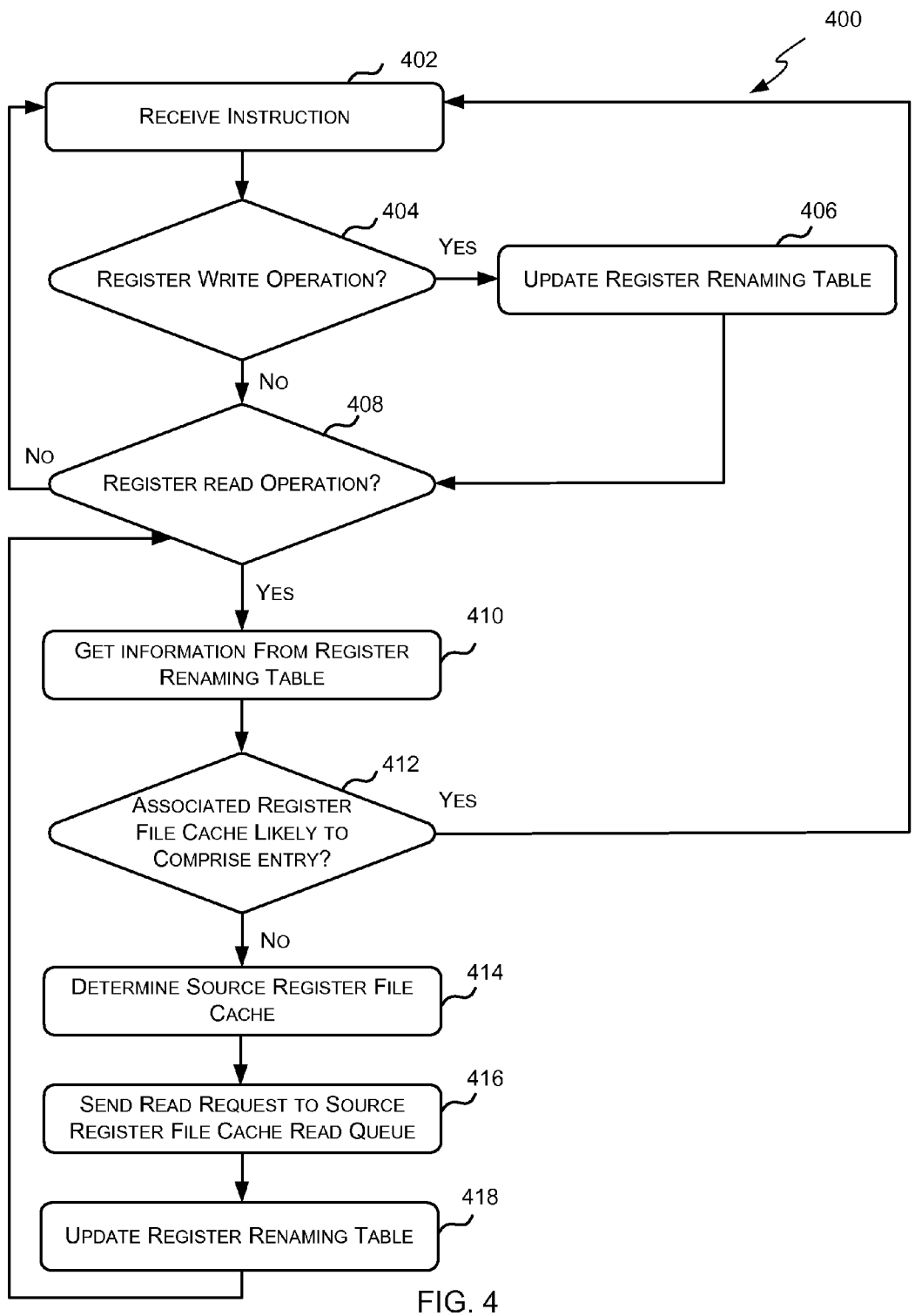
FIG. 4 is a flowchart of a first example method for determining whether to migrate data to a register file cache.

Reference is now made to FIG. 4 which illustrates a method 400, which may be executed by the migration requirement detector 302 of FIG. 3, for determining whether to migrate data to a register file cache. At step 402, the migration requirement detector 302 receives an instruction from the decode and renaming stage 104. As described above, the instruction may specify a register write operation and/or one or more register read operations; and the functional unit 118 or 120 that will execute the instruction (e.g. the "associated functional unit"). Once the instruction has been received, the method 400 proceeds to step 404.

At step 404, the migration requirement detector 302 determines whether the instruction received in step 402 comprises a register write operation. If the instruction comprises a register write operation, the method proceeds to step 406. If, however, the instruction does not comprise a register write operation, the method proceeds to step 408.

At step 406, the migration requirement detector 302 updates the register renaming table 106 for the destination register (e.g. the physical register written to by the register write operation) to indicate the associated functional unit (e.g. the functional unit that will execute the instruction) has recently accessed the destination register. For example, as described above in reference to FIG. 2, the migration requirement detector 302 may set the associated functional unit flag for the destination register to indicate the associated functional unit has recently accessed the destination register. Once the register renaming table 106 has been updated, the method 400 proceeds to step 408.

At step 408, the migration requirement detector 302 determines whether the instruction received in step 402 comprises a register read operation that has not already been processed by the migration requirement detector 302. Since each instruction can comprise more than one register read operation, each register read operation may be separately processed by the migration requirement detector 302 to determine if data is to be migrated to the associated register file cache. If the instruction comprises a register read operation that has not already been processed by the migration requirement detector 302, then the method 400 proceeds to step 410. If, however, the instruction does not comprise a register read operation that has not already been processed by the migration requirement detector 302, then the method 400 proceeds back to step 402 where the migration requirement detector 302 waits for the next instruction from the decode and renaming stage 104.

At step 410, the migration requirement detector 302 obtains information from the register renaming table 106 on which functional units 118 or 120 have recently accessed the physical register specified in the register read operation. Once the relevant data has been obtained from the register renaming table 106, the method 400 proceeds to step 412.

At step 412, the migration requirement detector 302 determines whether the register file cache for the associated functional unit (e.g. the functional unit that is to execute the instruction) is likely to comprise an entry for the source register specified in the register read operation. In some cases, determining whether a register file cache is likely to comprise an entry for a particular register comprises determining if the associated functional unit has recently accessed the particular register. For example, if the register read operation indicates that physical register seven is to be read by the first functional unit 118 then the migration requirement detector 302 may determine that the first register file cache 124 is likely comprise an entry for physical register seven if the register renaming table 106 indicates that the first functional unit 118 has recently accessed physical register seven.

If the migration requirement detector 302 determines that the register file cache for the associated functional unit is likely to comprise an entry for the source register then data is not migrated between register file caches and the method proceeds back to step 402 where the migration requirement detector 302 waits to receive the next instruction from the decode and renaming stage 104. If, however, the migration requirement detector 302 determines that the register file cache for the associated functional unit is unlikely to comprise an entry for the source register then the method 400 proceeds to step 414 where data migration from a source register file cache to the destination register file cache (the register file cache for the associated functional unit) is initiated.

At step 414, the source register file cache is determined. The source register file cache is the register file cache that is likely to comprise an entry for the specified register. The source register file cache may be determined to be the register file cache associated with the functional unit that has recently accessed the source register. Where there are only two functional units and thus two register file caches the source register file cache may be deemed to be the other register file cache. For example, where the destination register file cache is the first register file cache, the second register file cache may be deemed to be the source register file cache. Where, however, there are more than two functional units and thus more than two register file caches, the source register file cache may be determined by analyzing the data in the register renaming table 106 to determine which functional unit has recently accessed the specified register.

In some cases, once the source register file cache has been determined, the migration requirement detector 302 may send information to the source register file cache to inform the source register file cache that the source register should be considered a high priority to reduce the likelihood that the entry for the source register is evicted before the migration takes place.

Once the source register file cache has been determined, the method 400 proceeds to step 416.

At step 416, a request to read the source register is sent to the source register file cache read queue. The read request may identify the physical register to be read and the destination register file cache. Once the read request has been sent to the source register file cache read queue the method 400 proceeds to step 418.

At step 418, the migration requirement detector 302 updates the register renaming table 106 for the source register (e.g. the physical register read to by the register read operation) to indicate the associated functional unit (e.g. the functional unit that will execute the instruction) has recently accessed the source register. For example, as described above in reference to FIG. 2, the migration requirement detector 302 may set the associated functional unit flag for the source register to indicate the associated functional unit has recently accessed the source register. Once the register renaming table 106 has been updated, the method 400 proceeds back to step 402 where the migration requirement detector 302 waits for the next instruction from the decode and renaming stage 104.

Figure 5:
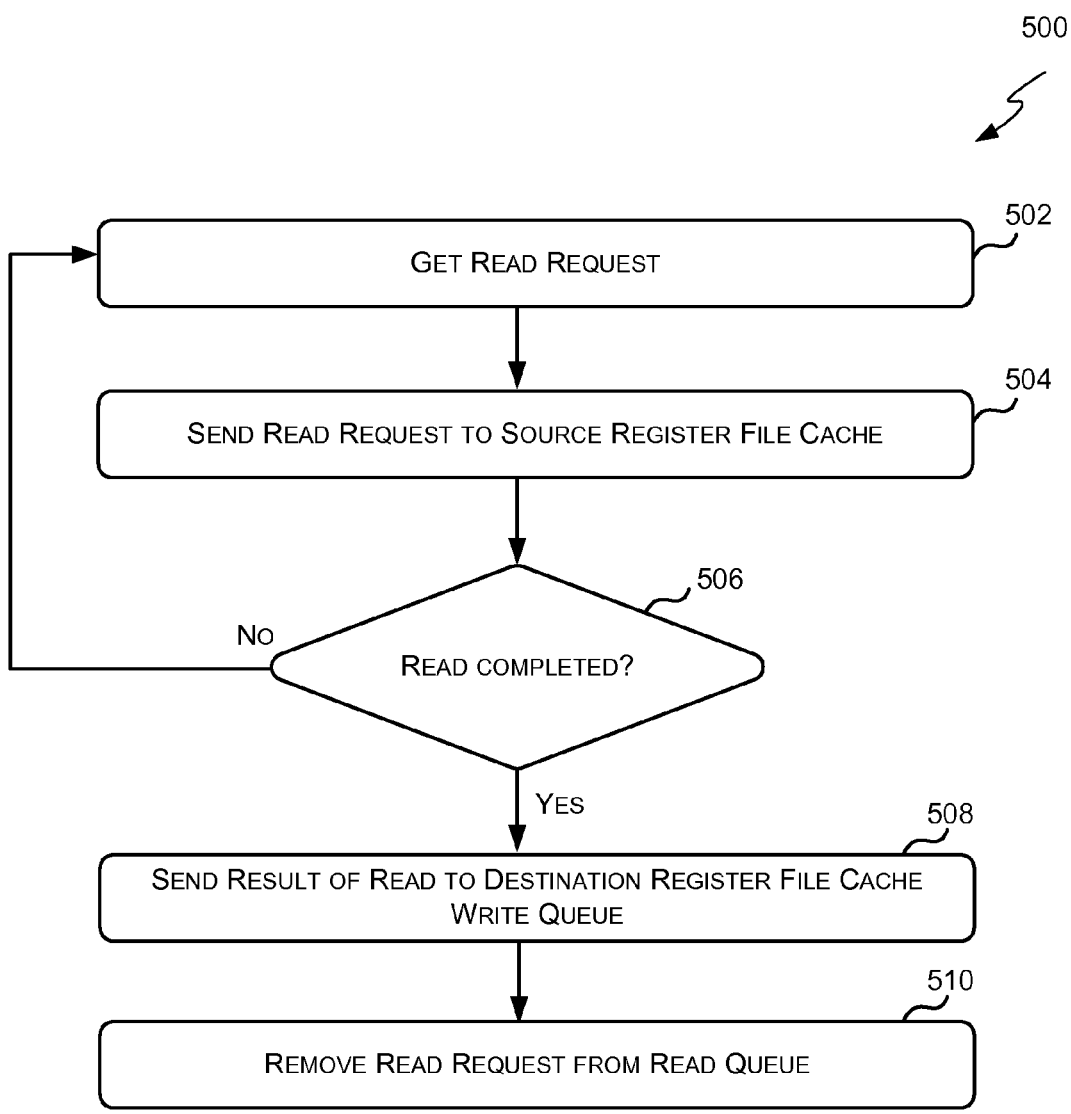
FIG. 5 is a flowchart of an example method for reading data from a register file cache.

Reference is now made to FIG. 5 which illustrates a method 500, which may be executed by the read queues 304 and 306 of FIG. 3, for reading data from a register file cache 124 or 126. At step 502, the read queue obtains a read request waiting in the read queue. In some cases the read queue obtains the oldest read request waiting in the read queue 304 or 306. Where the read queue is implemented as a circular buffer, obtaining the oldest read request in the read queue 304 or 306 may comprise obtaining the read request at the head of the buffer. Once a waiting read request has been obtained from the read queue 304 or 306, the method 500 proceeds to step 504.

At step 504, the read queue 304 or 306 sends the read request to the associated register file cache. In some cases the read queue 304 or 304 must wait until the associated register file cache has an available read port before sending the read request to the associated register file cache. Once the read request has been sent to the associated register file cache, the method 500 proceeds to step 506.

At step 506, the read queue 304 or 306 determines whether the read request was completed by the associated register file cache. For example, if the register file cache does not comprise an entry for the register specified in the request (e.g. because the prior write operation has not been executed by the functional unit) the register file cache may reject the request. If, however, the register file cache does comprise an entry for the register specified in the request then the register file cache may provide the read queue 304 or 306 with the results of the read. If the register read request was not completed the method 500 proceeds back to step 502. If, however, the register read request was completed by the associated register file cache and the read queue 304 or 306 received the results of the read in response, the method 500 proceeds to step 508.

At step 508, the read queue 304 or 306 provides the result received in step 506 to the destination register file cache write queue along with a request to write this data to the specified register. For example, where the destination register file cache is the first destination register file cache 124, the write request (including the result of the read executed in step 506) is sent to the first write queue 308. Once the write request has been provided to the destination register file cache write queue, the method proceeds to step 510.

At step 510, the read request selected in step 502 is removed from the read queue 304 or 306. Where the read queue 304 or 306 is implemented as a circular buffer, removing the read request from the read queue may comprise popping the read request from the head of the buffer. In some cases popping the read request from the head of the buffer may comprise incrementing the head pointer so that it points to the next read request in the buffer. Once the read request has been removed from the read queue 304 or 306, the method 500 ends.

Figure 6:
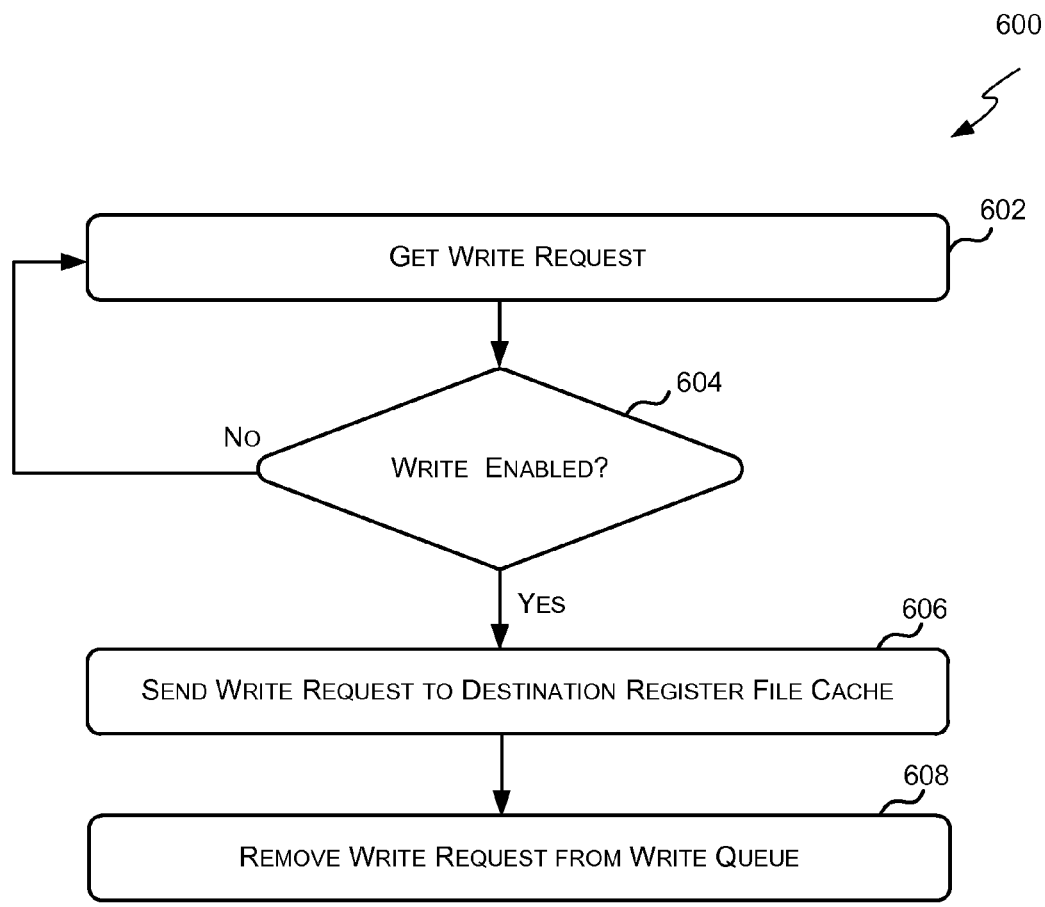
FIG. 6 is a flowchart of an example method for writing data to a register file cache.

Reference is now made to FIG. 6 which illustrates a method 600, which may be executed by the write queues 308 and 310 of FIG. 3, for writing data to a register file cache 124 or 126. At step 602, the write queue obtains a waiting write request from the write queue 308 or 310. In some cases the write queue obtains the oldest write request in the write queue 308 or 310. Where the write queue 308 or 310 is implemented as a circular buffer obtaining the oldest write request in the write queue 308 or 310 may comprise obtaining the write request at the head of the buffer. Once a waiting write request has been obtained from the write queue, the method 600 proceeds to step 604.

At step 604, the write queue 308 or 310 determines whether the associated register file cache is ready for writing. In some cases determining whether a register file cache is ready for writing comprises determining if there is an available write port to submit the write request to the register file cache. If the associated register file cache is ready for writing, then the method 600 proceeds to step 606. If, however, the associated register file cache is not ready for writing, then the method 600 proceeds back to step 602.

At step 606, the write queue 308 or 310 sends the write request to the associated register file cache 124 or 126 where the data specified in the request (the data read from the source register file cache) is written to the register specified in the request (the register specified in the register read operation). Once the write request has been submitted to the associated register file cache 124 or 126 the migration of data from the source register file cache to the destination register file cache is complete and the method 600 proceeds to step 608.

At step 608, the write request selected in step 602 is removed from the write queue 308 or 310. Where the write queue 308 or 310 is implemented as a circular buffer, removing the write request from the write queue 308 or 310 may comprise popping the write request from the head of the buffer. In some cases popping the write request from the head of the buffer may comprise incrementing the head pointer so that it points to the next write request in the buffer. Once the write request has been removed from the write queue 308 or 310, the method 600 ends.

Figure 7:
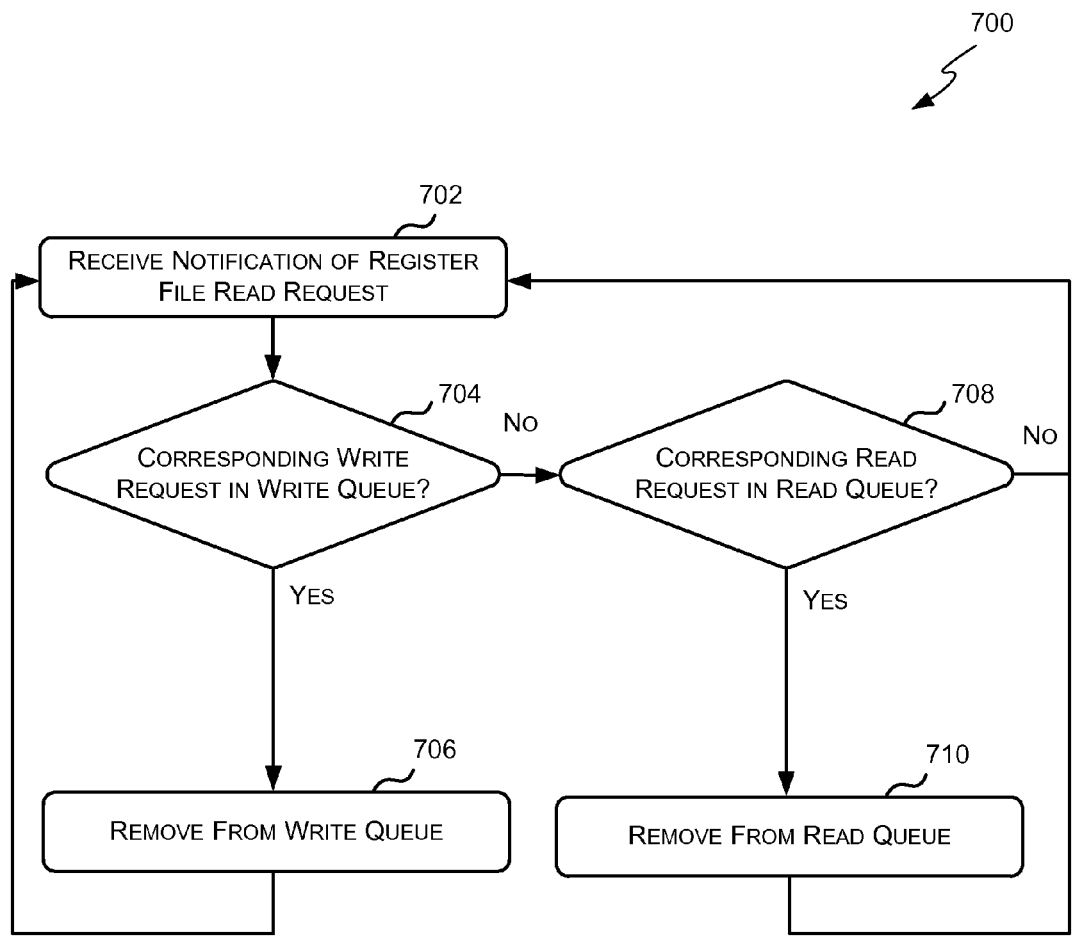
FIG. 7 is a flowchart of an example method for removing redundant read and write requests from the read and write queues of FIG. 3.

Reference is now made to FIG. 7 which illustrates a method 700, which may be executed by the redundancy checker 312, for removing redundant read and write requests from the read and write queues 304, 306, 308 and 310. At step 702, the redundancy checker 312 receives an indication from the register file 122 that it has received a read request. The indication may comprise the register to be read and the register file cache 124 or 126 that made the request. Once the indication has been received, the method proceeds to step 704.

At step 704, the redundancy checker 312 determines whether there is a write request in one of the write queues 308 or 310 that corresponds to the register file 122 read request. In some cases the redundancy checker 312 may be configured to determine there is a write request in a write queue 308 or 310 that corresponds to the register file 122 read request if (i) there is a write request in a write queue that writes to the register to be read from the register file; and (ii) that write request is in the write queue for the register file cache that requested the read of the register file 122. For example, if the first register file cache 124 requested a read of register twenty in the register file 122 then the redundancy checker 312 may determine there is a corresponding write request if there is a write request in the first write queue 308 that writes to register twenty.

If there is a write request in one of the write queues 308 or 310 that corresponds to the register file 122 read request then the method proceeds to step 706. If, however, there is no write request in the write queues 308 and 310 that corresponds to the register file read request then the method proceeds to step 708.

At step 706, the write request identified in step 706 is removed from the write queue 308 or 310. In some cases removing the write request from the write queue 308 or 310 comprises invalidating or nullifying the write request (e.g. setting an invalid bit associated with the write request that would indicate to the write queue 308 or 310 that the write request it not to be performed). Once the write request has been removed from the write queue 308 or 310, the method 700 proceeds back to step 702.

At step 708, the redundancy checker 312 determines whether there is a read request in one of the read queues 304 or 306 that corresponds to the register file 122 read request. In some cases the redundancy checker 312 may be configured to determine there is a read request in a read queue 304 or 306 that corresponds to the register file 122 read request if (i) there is a read request in a read queue that reads from the register specified in the register file read request; and (ii) the destination register file cache for that read request is the same as the register file cache that requested the read of the register file 122. For example, if the second register file cache 126 requested a read of register fourteen in the register file 122 then the redundancy checker 312 may determine there is a corresponding read request if there is a read request in the first read queue 304 that reads from register fourteen.

If there is a read request in one of the read queues 304 or 306 that corresponds to the register file 122 read request then the method proceeds to step 710. If, however, there is no read request in the read queues 304 and 306 that corresponds to the register file read request then the method proceeds to step 702.

At step 710, the read request identified in step 708 is removed from the read queue 304 or 306. In some cases removing the read request from the read queue 304 or 306 comprises invalidating or nullifying the read request (e.g. setting an invalid bit associated with the read request that would indicate to the read queue 304 or 306 that the read request it not to be performed). Once the read request has been removed from the read queue 304 or 306, the method 700 proceeds back to step 702.

Figure 8:
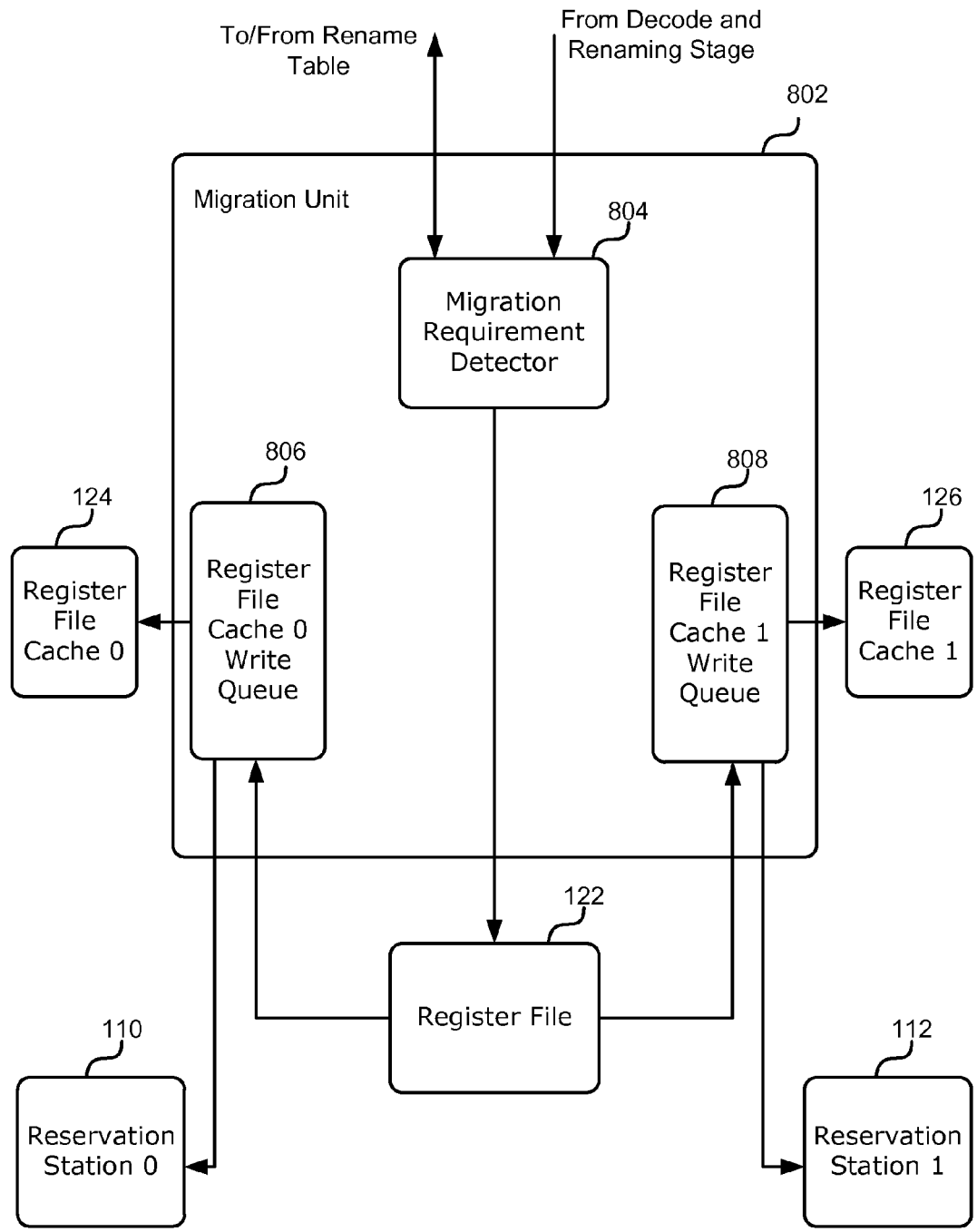
FIG. 8 is a schematic diagram of an alternate example migration unit.

Reference is now made to FIG. 8 which illustrates a second example migration unit 802 which may be used in the processor 100 of FIG. 1 instead of the migration unit 114 of FIG. 3 described above. As described above in reference to FIG. 1 the migration unit 802 is responsible for migrating data to a particular register file cache upon detecting that a particular register file cache is unlikely to comprise an entry to satisfy a particular register read operation. The example migration unit 802 of FIG. 8 migrates data from the register file to the particular register file cache to satisfy the particular register read operation.

The example migration unit 802 of FIG. 8 comprises a migration requirement detector 804 for receiving instructions from the decode and renaming stage 104 and determining whether to migrate data from the register file 122 to particular register file caches 124 or 126 to satisfy register read operations in the instructions; and a plurality of register file cache write queues 806 and 808 for storing and issuing write requests to a particular register file cache 124 and 126.

In some cases there is one write queue for each register file cache 124 and 126 in the processor. In the processor 100 of FIG. 1 there are two register file caches 124 and 126 and thus the example migration unit 802 of FIG. 8 comprises two write queues 806 and 808. The first write queue 806 writes to the first register file cache 124, and the second write queue 808 writes to the second register file cache 126. It will be evident to a person of skill in the art that the migration unit 802 may comprise more write queues depending on the number of register file caches in the processor.

The migration requirement detector 804 receives instructions from the decode and renaming stage 104. As described above, each instruction may comprise a register write operation and/or one or more register read operations; and an indication of the functional unit that will execute the instruction.

For each register write operation the migration requirement detector 804 updates the register renaming table 106 to indicate that the physical register referred to therein (e.g. the physical register written to by the register write operation) has been recently accessed by the functional unit that will execute the instruction.

For each register read operation the migration requirement detector 804 determines whether to migrate data from the register file 122 to one of the register file caches 124 of 126 to satisfy the register read operation. In some cases determining whether to migrate data to a particular register file cache 124 or 126 may comprise analyzing the data in the register renaming table 106 to determine if the register file cache 124 or 126 for the functional unit 118 or 120 associated with the register read operation (e.g. the functional unit 118 or 120 that will execute the register read operation) is likely to comprise an entry for the specified register. In some cases determining whether the register file cache is likely to comprise an entry for the specified register comprises determining if the register renaming table 106 indicates that the functional unit associated with the register file cache recently accessed the physical register.

If the data in the register renaming table 106 indicates that the associated register file cache is unlikely to comprise an entry for the specified register, then the migration requirement detector 804 may determine that data relating to the specified register is to be migrated from the register file 122 to the associated register file cache.

In other cases determining whether to migrate data to a particular register file cache may comprise querying the register file cache 124 or 126 for the functional unit 118 or 120 associated with the register read operation (e.g. the functional unit 118 or 120 that will execute the register read operation) to determine if it currently comprises data for the specified register.

Once the migration requirement detector 804 determines that data is to be migrated from the register file 122 to a register file cache 124 or 126 the migration requirement detector 804 initiates the migration by issuing an appropriate migration request to the register file 122. The migration request may specify the register to be migrated and the destination register file cache (the register file cache the migrated data is to be written to). An example method for determining whether to migrate data from the register file to a register file cache which may be executed by the migration requirement detector 804 is described with reference to FIG. 9.

Within the register file 122, each physical register has a data entry field (which specifies the current value of the register) and one or more control flags. The one or more control flags may include a valid flag to indicate that the value in the data entry field is valid, and one migration flag per register file cache 124 and 126 to indicate that the specified register file cache 124 or 126 has requested that the data be migrated to it. Upon receiving a migration request from the migration requirement detector 804, the register file 122 sets the migration flag associated with the destination register file cache 124 or 126 to indicate a request has been made to migrate the data for the particular register to the destination register file cache. Once the valid flag is set the register file 122 sends the data in the data entry field and the register number to each write queue 806 and/or 808 associated with a register file cache which has the migration flag set and then clears the migration flag(s).

Each write queue 806 or 808 receives write requests for a specific register file cache 124 or 126 from the register file 122 and stores them in a buffer in the order in which they are received. The write requests in the buffer are submitted to the corresponding register file cache 124 or 126 in order as the corresponding register file cache 124 or 126 becomes available for writing. Once the write request has been completed by the register file cache 124 or 126, the data has been successfully migrated from the register file to the destination register file cache.

A method for writing data to a register file cache which may be executed by the write queues 806 and 808 was described with reference to FIG. 6.

The following two examples will be used to illustrate the data flow through the migration unit 802.

In a first example, the migration requirement detector 804 determines that data for register six is to be migrated from the register file 122 to the second register file cache 126. To initiate the migration the migration requirement detector 804 issues a migration request to the register file 122. The migration request specifies that the data for register six is to be migrated to the second register file cache 126. Upon receiving the migration request the register file 122 sets the migration flag for the second register file cache 126. If the valid flag for register six is set (indicating the data in the data entry field is valid) the register file 122 clears the migration flag for the second register file cache 126 and obtains the data in the data entry field for register six and sends it to the second write queue 808 with a request to write the data to register six. Once the second register file cache is 126 ready to be written to, the write request is sent to the second register file cache 126 for execution. Once the write has been executed the data has been migrated from the register file 122 to the second register file cache 126.

In a second example, the migration requirement detector 804 determines that data for register twelve is to be migrated from the register file 122 to the first register file cache 124. To initiate the migration the migration requirement detector 804 issues a migration request to the register file 122. The migration request specifies that the data for register twelve is to be migrated to the first register file cache 124. Upon receiving the migration request the register file 122 sets the migration flag for the first register file cache 124 for register twelve. If the valid flag for register twelve is not set (indicating the data in the data entry field is not valid) the register file 122 waits until the valid flag is set Once the valid flag is set, the register file 122 clears the migration flag for the first register file cache 124 and obtains the data in the data entry field for register twelve and sends it to the first write queue 806 with a request to write the data to register twelve. Once the first register file cache 124 is ready to be written to, the write request is sent to the first register file cache 124 for execution. Once the write has been executed the data has been migrated from the register file 122 to the first register file cache 124.

Generally as described above in reference to FIG. 2 an instruction is not issued from a reservation station 110 or 112 to a functional unit 118 or 120 until all the operands for the instruction are available. To ensure that an instruction comprising a register read operation is not executed until there is an entry in the corresponding register file cache 124 or 126 to satisfy the register read operation, the reservation station 110 or 112 may be configured to only receive operand ready broadcasts from the pipelines in the corresponding functional unit or from the corresponding register file cache write queue 806 or 808. For example, a particular reservation station 110 or 112 may receive a broadcast (a) from the corresponding functional unit indicating that the corresponding register file cache has an entry for a specific register when the register is written to by that particular functional unit; or (b) from the corresponding register file cache write queue 806 or 808 when the register file 122 has migrated data to that particular functional unit's register file cache.

Figure 9:
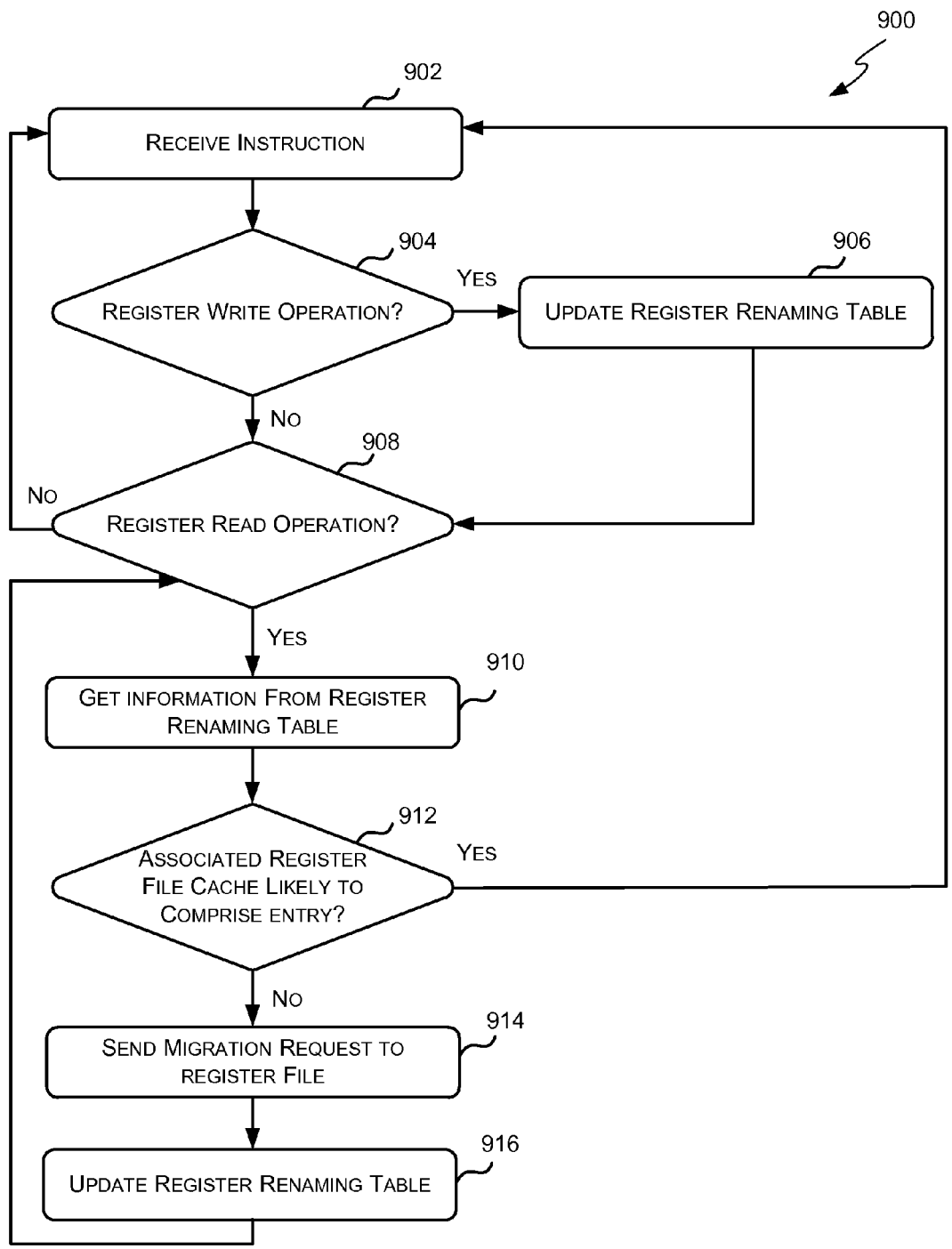
FIG. 9 is a flowchart of a second example method for determining whether to migrate data to a register file cache.

Reference is now made to FIG. 9 which illustrates a method 900, which may be executed by the migration requirement detector 804 of FIG. 8, for determining whether to migrate data to a register file cache. At step 902, the migration requirement detector 804 receives an instruction from the decode and renaming stage 104. As described above, the instruction may specify a register write operation and/or one or more register read operations; and the functional unit 118 or 120 that will execute the instruction (e.g. the "associated functional unit"). Once the instruction has been received, the method 900 proceeds to step 904.

At step 904, the migration requirement detector 804 determines whether the instruction received in step 902 comprises a register write operation. If the instruction comprises a register write operation, the method proceeds to step 906. If, however, the instruction does not comprise a register write operation, the method 900 proceeds to step 908.

At step 906, the migration requirement detector 804 updates the register renaming table 106 to indicate the associated functional unit (e.g. the functional unit that will execute the instruction) has recently accessed the destination register (e.g. the physical register written to by the register write operation). For example, as described above in reference to FIG. 2, the migration requirement detector 804 may set the flag for the associated functional unit to indicate the associated functional unit has recently accessed the destination register. Once the register renaming table 106 has been updated, the method 900 proceeds to step 908.

At step 908, the migration requirement detector 804 determines whether the instruction received in step 902 comprises a register read operation that has not already been processed by the migration requirement detector 804. Since each instruction may comprise more than one register read operation, each register read operation may be separately processed by the migration requirement detector 804 to determine if data is to be migrated to the associated register file cache. If the instruction comprises a register read operation that has not already been processed by the migration requirement detector 804, then the method 900 proceeds to step 910. If, however, the instruction does not comprise a register read operation that has not already been processed by the migration requirement detector 804, then the method 900 proceeds back to step 902 where the migration requirement detector 804 waits for the next instruction from the decode and renaming stage 104.

At step 910, the migration requirement detector 804 obtains information from the register renaming table 106 on which functional units 118 or 120 have recently accessed the physical register specified in the register read operation. Once the relevant data has been obtained from the register renaming table 106, the method 900 proceeds to step 912.

At step 912, the migration requirement detector 804 determines whether the register file cache for the associated functional unit is likely to comprise an entry for the source register. In some cases, determining whether a register file cache is likely to comprise an entry for a particular register comprises determining if the associated functional unit has recently accessed the particular register. For example, if the register read operation indicates that physical register twenty-one is to be read by the first functional unit 118 then the migration requirement detector 804 may determine that the first register file cache 124 is likely to comprise an entry for physical register twenty-one if the register renaming table 106 indicates that the first functional unit 118 has recently accessed physical register twenty-one.

If the migration requirement detector 804 determines that the register file cache for the associated functional unit (e.g. the functional unit that is to execute the register read operation) is likely to comprise an entry for the specified register then data is not migrated from the register file to the register file cache and the method proceed back to step 902 where the migration requirement detector 804 waits to receive the next instruction. If, however, the migration requirement detector 804 determines that the associated register file cache is unlikely to comprise an entry for the specified register then the method 900 proceeds to step 914 where migration of data from the register file to the associated register file cache (i.e. the register file cache for the functional unit that is to execute the instruction) is initiated.

At step 914, a request to migrate the register specified in the register read operation is sent to the register file 122. The migration request may identify the physical register to be migrated and the register file cache the data is to be written to. Once the migration request has been sent to the register file 122 the method 900 proceeds to step 916.

At step 916, the migration requirement detector 804 updates the register renaming table 106 to indicate the associated functional unit (e.g. the functional unit that will execute the instruction) has recently accessed the source register (e.g. the physical register read by the register read operation). For example, as described above in reference to FIG. 2, the migration requirement detector 804 may set the flag for the associated functional unit to indicate the associated functional unit has recently accessed the source register. Once the register renaming table 106 has been updated, the method 900 proceeds back to step 902 where the migration requirement detector 804 waits for the next instruction.

While the examples described above relate to single-threaded out-of-order processors, the methods and principles described herein may equally be applied to multi-threaded out-of-order processors.

Figure 10:
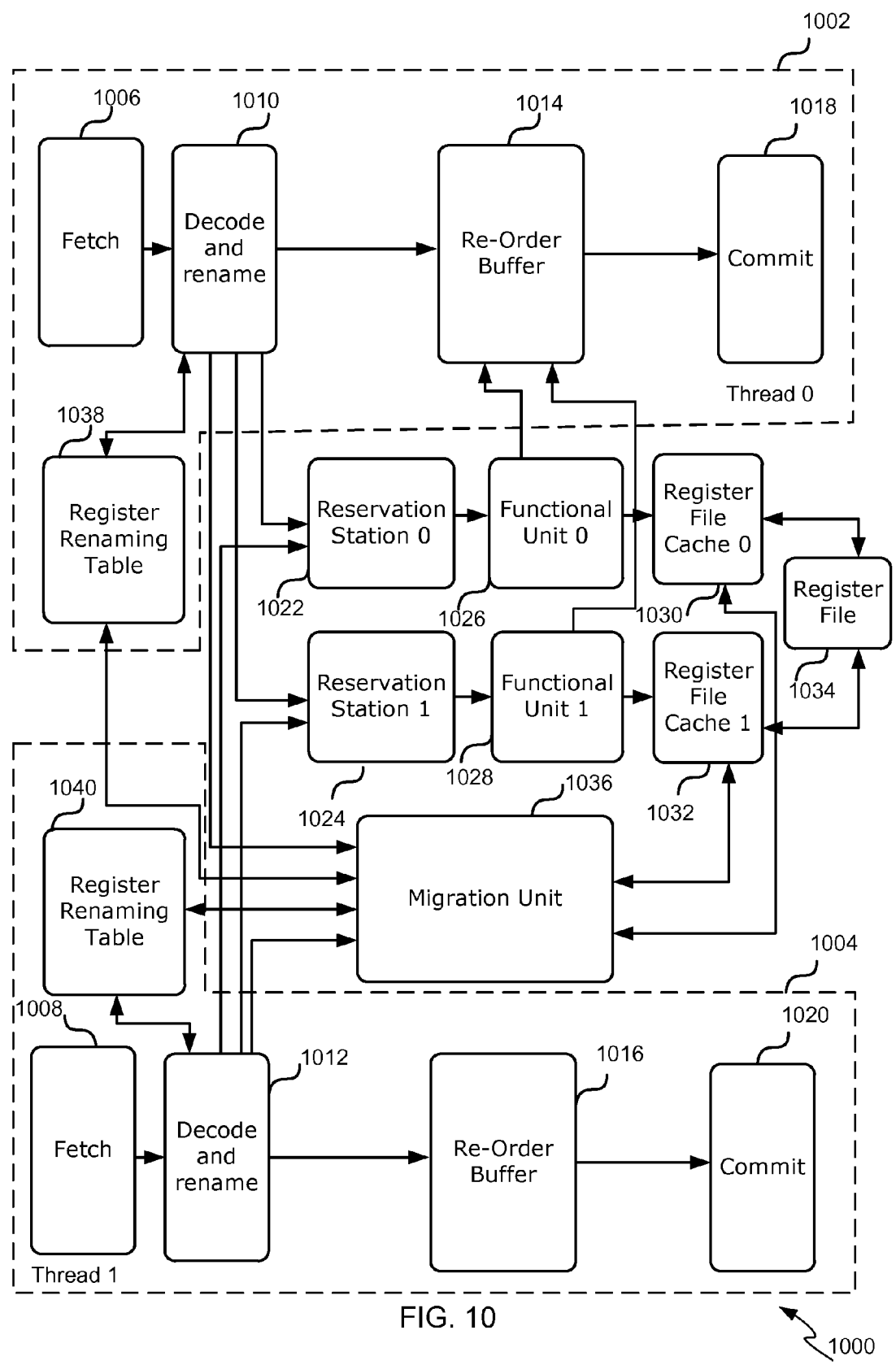
FIG. 10 is a schematic diagram of an example multi-threaded out-of-order processor.

Reference is now made to FIG. 10 which illustrates a schematic of a multi-threaded out-of order processor 1000. The processor 1000 comprises two threads 1002 and 1004 which will be referred to herein as thread 0 and thread 1 respectively. Each thread 1002 and 1004 comprises a fetch stage 1006 or 1008, a decode and renaming stage 1010 or 1012, a re-order buffer 1014 or 1016, and a commit stage 1018 or 1020 as described above in reference to FIG. 1. The threads 1002 and 1004 share the reservation stations 1022 and 1024, functional units 1026 and 1028, register file caches 1030 and 1032, register file 1034 and migration unit 1036 as described above in reference to FIG. 1.

The decode and renaming stage 1010 or 1012 decodes and renames each instruction and then dispatches the instruction to the appropriate reservation station 1022 or 1024 and the migration unit 1036. The migration unit 1036 may then implement one of the methods described in reference to FIG. 4 or FIG. 9 to update a register renaming table 1038 or 1049 and migrate data to the appropriate register file cache to satisfy any register read operations. In some cases, as shown in FIG. 10, each thread 1002 and 1004 may keep its own register renaming table 1038 or 1040. However, in other cases the threads 1002 and 1004 may share a single register renaming table. In these cases the entries of the shared register renaming table may be indexed by the architectural register and thread number/identifier.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of migrating data to a register file cache, the method comprising:
    storing in a register renaming table an entry for each of a plurality of physical registers, each entry comprising information indicating each functional unit of a plurality of functional units that has accessed the physical register;
    receiving at a migration unit a register read operation to be executed for a particular functional unit,
    the register read operation specifying a particular physical register to be read;

reviewing the entries in the register renaming table at the migration unit to determine whether the particular functional unit has accessed the particular physical register; and in response to determining the particular functional unit has not accessed the particular physical register, migrating data to a register file cache associated with the particular functional unit.

2. An apparatus with a migration unit arranged to migrate data to a register file cache, the migration unit comprising:
a migration requirement detector configured to:
receive a register read operation to be executed for a particular functional unit of a plurality of functional units, the register read operation specifying a particular physical register to be read;
review entries in a register renaming table to determine whether the particular functional unit has accessed the particular physical register, the register renaming table comprising an entry for each of a plurality of physical registers, each entry comprising information indicating each functional unit that has accessed the physical register; and
in response to determining that the particular functional unit has not accessed the particular physical register, initiate migration of data to a register file cache associated with the particular functional unit.

3. The apparatus of claim 2, wherein initiating migration of data to the register file cache associated with the particular functional unit comprises initiating migration of data from another register file cache to the register file cache associated with the particular functional unit.

4. The apparatus of claim 3, wherein the other register file cache is a register file cache associated with a functional unit that has accessed the particular physical register.

5. The apparatus of claim 3, wherein the migration unit further comprises a plurality of read queues, each read queue configured to store read requests for an associated register file cache and send the read requests to the associated register file cache; and wherein initiating migration of data from the other register file cache to the register file cache associated with the particular functional unit comprises sending a read request to the read queue associated with the other register file cache to read the particular physical register.

6. The apparatus of claim 5, wherein the migration unit further comprises a plurality of write queues, each write queue configured to store write requests associated with an associated register file cache and send the write requests to the associated register file cache; and wherein each read queue is further configured to send a write request to the write queue associated with the register file cache associated with the particular functional unit to write the results of the read request to the particular physical register.

7. The apparatus of claim 6, wherein the migration unit further comprises a redundancy checker in communication with the read and write queues, the redundancy checker configured to:
determine whether the particular functional unit has requested the particular physical register be read from a register file; and
in response to determining the particular functional unit has requested the particular physical register be read from the register file, remove the read request from the read queue, or the write request from the write queue.

8. The apparatus of claim 2, wherein initiating migration of data to the register file cache associated with the particular functional unit comprises initiating migration of data from a register file to the register file cache associated with the particular functional unit.

9. The apparatus of claim 8, wherein initiating migration of data from a register file to the register file cache associated with the particular functional unit comprises sending a migration request to the register file to migrate data for the particular physical register.

10. The apparatus of claim 9, wherein the migration unit further comprises a plurality of write queues, each write queue configured to store write requests for an associated register file cache and send the write requests to the associated register file cache; and wherein each write queue is further configured to receive write requests from the register file to write the results of the migration request to the particular physical register.

11. The apparatus of claim 2, wherein each functional unit of the plurality of functional units is associated with a separate register file cache for reading from and writing to physical registers.

12. The apparatus of claim 2, wherein the migration requirement detector is configured to update the register renaming table in response to receiving an instruction that comprises a register write operation.

13. The apparatus of claim 12, wherein updating the register renaming table comprises:
receiving an instruction;
analyzing the instruction to determine which functional unit of the plurality of functional units is to execute the instruction;
analyzing the instruction to determine whether the instruction comprises a register write operation;
in response to determining the instruction comprises a register write operation, updating the register renaming table to indicate that the functional unit that is to execute the instruction has accessed a physical register referred to in the register write operation.

14. The apparatus of claim 2, wherein the migration requirement detector is further configured to, in response to determining the particular functional unit has not accessed the particular physical register, update the register renaming table to indicate the particular functional unit has accessed the particular physical register.

15. A non-transitory computer readable storage medium having stored thereon computer readable instructions that, when processed at a computer system for generating a manifestation of an integrated circuit, cause the computer system to generate a manifestation of a migration unit arranged to migrate data to a register file cache, said migration unit comprising:
a migration requirement detector configured to:
receive a register read operation to be executed for a particular functional unit of a plurality of functional units, the register read operation specifying a particular physical register to be read;
review entries in a register renaming table to determine whether the particular functional unit has accessed the particular physical register, the register renaming table comprising an entry for each of a plurality of physical registers, each entry comprising information indicating each functional unit that has accessed the physical register; and
in response to determining that the particular functional unit has not accessed the particular physical register, initiate migration of data to a register file cache associated with the particular functional unit.

16. A non-transitory computer readable storage medium having stored thereon computer readable instructions that, when processed at a computer system for generating a manifestation of an integrated circuit, cause the computer system to generate a manifestation of a processor configured to:
   receive a register read operation to be executed for a particular functional unit of a plurality of functional units, the register read operation specifying a particular physical register to be read;
   review entries in a register renaming table to determine whether the particular functional unit has accessed the particular physical register, the register renaming table comprising an entry for each of a plurality of physical registers, each entry comprising information indicating each functional unit that has accessed the physical register; and
   in response to determining the particular functional unit has not accessed the particular physical register, initiate migration of data to a register file cache associated with the particular functional unit.

* * * * *